No. 867,660. PATENTED OCT. 8, 1907.
W. H. JOHNSON.
AUTOMATIC STEAM COOKER.
APPLICATION FILED APR. 25, 1907.
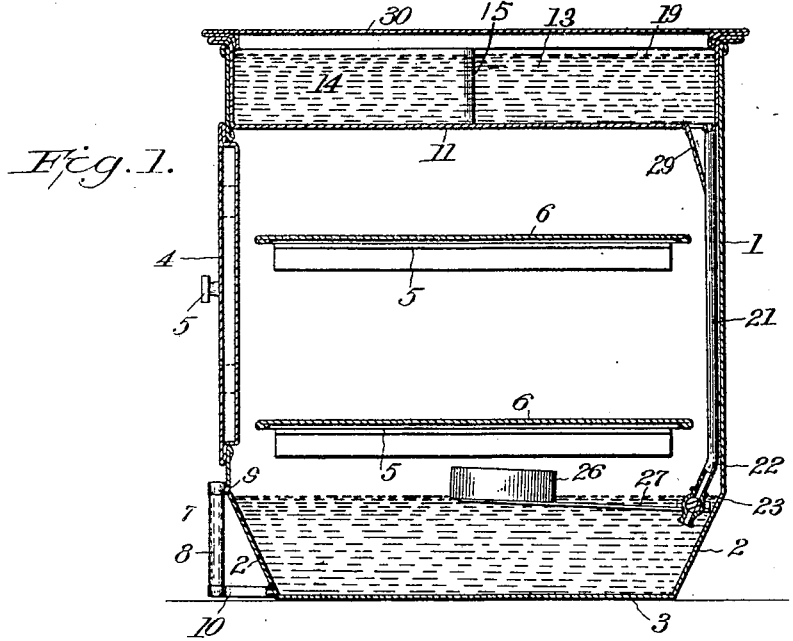
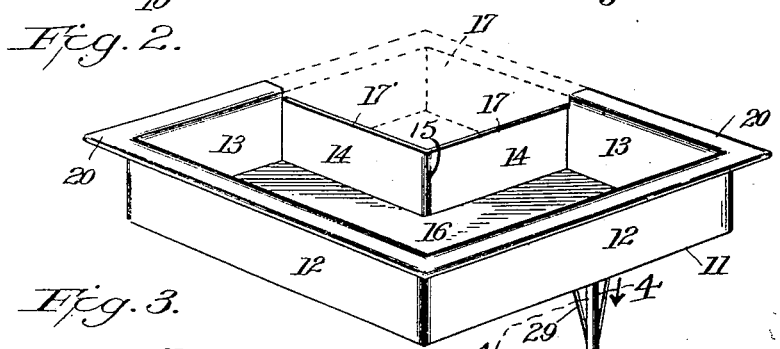
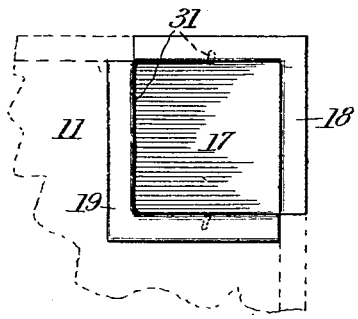
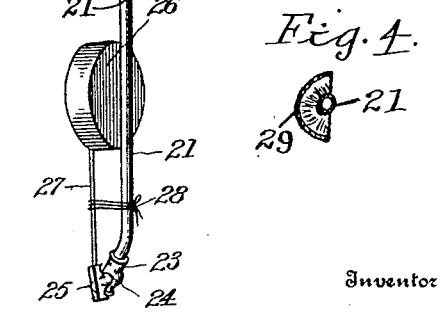
Witnesses
C. H. Walker
E. J. Sweet
Inventor
William Hamilton Johnson.
By E. E. Vrooman,
his Attorney.

UNITED STATES PATENT OFFICE.

WILLIAM HAMILTON JOHNSON, OF MIAMI, FLORIDA, ASSIGNOR OF ONE-HALF TO EDWARD J. SWEET, OF MIAMI, FLORIDA.

AUTOMATIC STEAM-COOKER.

No. 867,660.      Specification of Letters Patent.      Patented Oct. 8, 1907.

Application filed April 25, 1907. Serial No. 370,218.

*To all whom it may concern:*

Be it known that I, WILLIAM HAMILTON JOHNSON, a citizen of the United States, residing at Miami, in the county of Dade and State of Florida, have invented certain new and useful Improvements in Automatic Steam-Cookers, of which the following is a specification, reference being had therein to the accompanying drawing.

This invention relates to an improvement in cookers, and particularly to an automatic steam cooker.

The object of the invention is the provision of means for facilitating automatically maintaining a constant supply of water in a steam-generating receptacle.

Another object of the invention is the improvement of the construction of a steam cooker, which comprises a minimum number of parts, is simple in operation, and comparatively inexpensive to construct.

A further object of the invention is the construction of a steam cooker, which is provided with peculiarly constructed means, whereby water is automatically maintained at a sufficient depth in the steam cooker for preventing the same boiling dry, while it is heated, by any suitable means, as for instance, when supported upon a stove.

With these and other objects in view, the invention consists of certain novel constructions, combinations, and arrangements of parts, as will be hereinafter fully described and claimed.

In the drawings: Figure 1 is a vertical, sectional view of the steam cooker constructed in accordance with the present invention. Fig. 2 is a perspective view of the tank or reservoir and valve device of the cooker, constructed in accordance with the present invention. Fig. 3 is a fragmentary, top plan view of my improved steam cooker. Fig. 4 is a horizontal section taken on line 4, 4, Fig. 2, and looking in the direction of the arrow.

Referring to the drawings, 1 designates the steamer or primary receptacle, which is, preferably, provided near its bottom with an inwardly-extending portion 2, terminating at its lower end in the bottom 3. By reason of the inwardly-extending portion of the primary receptacle or steamer 1, the same does not cover as much surface of a support, as would be the case if the sides of the receptacle 1 were not formed inwardly, at 2. The receptacle 1 is, preferably, shown in the accompanying drawings, as substantially square in shape.

A door 4 is, preferably, hinged to the front of the receptacle 1, and is secured in a closed position upon the receptacle at 5, by any ordinary fastening means.

Positioned within and, preferably, secured to opposite walls of the receptacle 1, are horizontal brackets 5, 5. Resting upon these brackets 5 are removable shelves 6, which shelves can be easily removed from receptacle 1 through door 4.

An indicator 7 is secured, preferably, to the front of the receptacle 1 and comprises, preferably, a glass tube 8 in communication, at its ends, with the interior of the receptacle 1 through the medium of tubes or pipes 9 and 10. By reason of the indicator 7, the depth of the liquid in receptacle 1 can be ascertained at a glance.

The tank or receptacle 11 is provided with sides 12, of substantially the same length and with ends 13 of substantially the same length, but of less length than the sides 12. Inner sides 14 are secured, at their inner ends 15, at right-angles to each other, and their outer ends are connected to the ends 13 of the tank. The tank is provided with a bottom 16 connecting the lower ends of sides 12 and 14 and ends 13. It is to be noted that my tank or reservoir is, preferably, substantially L-shaped, so as to accommodate an auxiliary tank or receptacle 17 in engagement with the inner sides 14. The auxiliary receptacle, see Fig. 3, is provided with outer flanges 18 and inner flanges 19, which flanges 18 rest upon the upper edges of the tank 1 and the inner flanges 19 rest upon the upper edges 17' of the inner sides 14 of the tank or reservoir. It is to be noted that the flanges 18 of the auxiliary receptacle 17 constitute a continuation of the flanges 20 of the tank or reservoir 11. The tank or reservoir 11 is provided for containing all water to be supplied to the receptacle 1, while the auxiliary receptacle 17 is adapted to retain a suitable beverage, as coffee, and as the bottom of the auxiliary receptacle is exposed to the action of the steam in the receptacle 1, it will be obvious that the liquid in said auxiliary receptacle can be quickly heated and retained in such condition. It is to be noted that the tank 11 and auxiliary receptacle 17 constitutes a cover or closure for the steam-generating chamber of receptacle 1; the tank or receptacle 11 and the receptacle 17 being positioned parallel within the primary receptacle 1.

A vertical tube or pipe 21 is secured at its upper end to the bottom of the tank or reservoir contiguous to, preferably, the back of the receptacle 1. The tube or pipe 21 is bent, as at 22, contiguous to its lower end, and, preferably, between the bent portion 22 and extreme lower end of the pipe 21, there is formed a valve-casing 23, within which valve-casing is mounted a rotatable valve-member 24 provided with, preferably, a flat extension upon the outer side of the valve-casing 23. A hollow, preferably, metallic float 26 is connected by means of a stem or rod 27 to the flat extension 25 of valve 24. The stem 27 extends across the bottom of the float 26, and thereby constitutes reinforcing means for said float, besides increasing the strength of the connection between the float and the stem 27. The inner end of the stem 27 also extends across, preferably, the lower portion of the flat extension 25, and further increases the strength of the connection between said stem and said extension. When it is desired to ship or transport my improved cooker, the tank or reservoir 11 can be quickly lifted from the receptacle 1 and float 26 tied against the vertical tube 21, by any suitable means, as for instance, a cord or wire 28, shown in Fig. 2. After the tank or receptacle 11 is positioned within receptacle 1 and the fastening means 28 removed, the float will be free to move in a vertical plane within the steamer or receptacle 1, so that the flow of water, from the tank or reservoir 11, will be controlled owing to the depth of water in the bottom of receptacle 1. As the water in receptacle 1 is generated into steam, the float 26 will, consequently, be lowered, and owing to the fact that the lowering of the float 27 opens the valve 24, a fresh supply of water will pass from the tank or reservoir 11 through tube or pipe 21 into said receptacle. It will be obvious that the valve-carried float 26 automatically controls the depth of water in receptacle 1.

The connection between the upper end of pipe 21 and the bottom of the tank or receptacle 11 is braced or strengthened by means, preferably, of a semi-conical brace 29. The upper, widest end of the brace 29 is secured against the bottom of the tank 11 and the lower end is secured to the pipe 21, see particularly Fig. 2. By reason of this peculiarly-constructed brace, a very rigid connection is formed, as the engaging portion of said brace with the tank 11, is comparatively broad, besides said peculiarly-constructed brace permits the interior of the same to be freely cleaned.

A cover 30 is suitably supported upon the flanges 20 of tank 11 and the flanges 18 of auxiliary receptacle 17, thereby covering the entire structure, and confining steam passing between the auxiliary receptacle 17 and the tank 11 within the cooker.

While I have, preferably, shown the auxiliary receptacle 17 substantially square in shape, it will be obvious that, by following out the same principle of construction, any shaped receptacle may be retained in a suitably constructed opening between the tank 11 and the side of receptacle 1, if the auxiliary receptacle is provided with flanges at its upper edges, whereby it would be suspended upon the tank 11 and the receptacle 1. The auxiliary receptacle 17 may be provided with a suitable handle or lifting means, as for instance, bail 31, so that said receptacle can be freely lifted from or placed upon the tank 11 and receptacle 1. Owing to the peculiar construction of the valve 24, stems 27 and float 26, when the float 26 is against the bottom 3 of the receptacle 1, the valve will be entirely open, whereas, as the float 26 is moved upward, the valve will be gradually closed until it reaches substantially the position shown in Fig. 1, when said valve will be entirely closed.

From practical experience, I have found that, when the bottom 3 of receptacle 1 is covered a suitable depth with water, sufficient to immerse the ends of the pipe 21, and the tank or reservoir 11 is filled, the cooker can be placed over a fire and food placed upon the shelves 6 and a beverage in auxiliary receptacle 17, with comparative safety against burning, for a long period, as a uniform depth of water will be automatically maintained in the bottom of receptacle 1.

What I claim is:

1. In an automatic steam cooker, the combination with a receptacle provided with an upper, open end, of a tank supported upon the upper end of said receptacle and partly closing said end, an auxiliary receptacle supported upon the upper end of said receptacle and on said tank, a tube secured at one end to the bottom of said tank and extending downwardly within said first-mentioned receptacle, a valve-casing formed upon said tube, a rotatable valve-member positioned within said valve casing and provided at one end with an extension, a stem fixedly secured near one end to said extension, and a float fixedly secured to said stem near its opposite end.

2. In an automatic steam cooker, the combination with a receptacle provided with an upper, open end, of a substantially L-shaped tank supported upon the upper end of said receptacle, a substantially square, auxiliary receptacle supported upon the upper end of said first-mentioned receptacle and upon part of said tank, and valve means carried by said tank.

3. In an automatic steam cooker, the combination with a receptacle provided with an open end, of a tank supported entirely upon part of the upper edges of said receptacle, an auxiliary receptacle supported partly upon some of the upper edges of said receptacle and upon said tank, and valve means carried by said tank.

4. In a steam cooker, the combination with a receptacle provided with an open end, of a closure for said end comprising a plurality of receptacles, one supported entirely upon said first-mentioned receptacle and the other supported partly upon said first-mentioned receptacle and partly upon the other receptacle of the closure, and valve means carried by one of the receptacles constituting said closure.

5. In a steam cooker, the combination with a receptacle provided with an upper open end, of a detachable tank or receptacle positioned within the upper end of and supported only upon the upper edges of said first-mentioned receptacle, a pipe secured near one end to the bottom of said tank or receptacle, a rotatable valve carried by the pipe near its lower end, said valve provided with a flat extension, a flat float contiguous to said extension, and a straight stem extending entirely across said float and extension of the valve, whereby the connection between said float and stem, and stem and extension is strengthened.

6. In a steam cooker, the combination with a primary receptacle having an upper, open end, an auxiliary receptacle positioned within the upper, open end of said primary receptacle and resting upon its upper edges, of a vertical pipe engaging, near its upper end, the bottom of said auxiliary receptacle, said pipe positioned near one side of said auxiliary receptacle and normally engaging the side of said primary receptacle, a semi-conical brace fixedly secured at its upper, widest end to the bottom of said auxiliary receptacle and at its lower, narrowest end to said vertical pipe, the vertical edges of said brace positioned parallel with the side of said primary receptacle, whereby the interior of said brace may be cleaned and said vertical pipe braced and positioned contiguous to the side of the primary receptacle, and valve means carried by said pipe near its lower end.

In testimony whereof I hereunto affix my signature in presence of two witnesses.

WILLIAM HAMILTON JOHNSON.

Witnesses:
JOHN N. WORLEY,
NELLIE L. WHITCOMB.